June 11, 1940.  F. A. NICHOLSON ET AL  2,204,439
MECHANISM FOR MACHINE FINISHED MATCHING OR EDGE JOINTING
LUMBER FOR STOCK OF NONUNIFORM WIDTH
Filed Dec. 21, 1936   5 Sheets-Sheet 1

INVENTORS
WILMOT T. PRITCHARD
FREDERICK A. NICHOLSON
BY
ATTORNEY

Fig. 6

Patented June 11, 1940

2,204,439

UNITED STATES PATENT OFFICE 2,204,439

MECHANISM FOR MACHINE FINISHED MATCHING OR EDGE JOINTING LUMBER FOR STOCK OF NONUNIFORM WIDTH

Frederick A. Nicholson and Wilmot T. Pritchard, Seattle, Wash., assignors to Stetson-Ross Machine Company, Seattle, Wash., a corporation of Washington Application December 21, 1936, Serial No. 116,965

14 Claims. (Cl. 144—114)

The invention relates to mechanism for machine finished matching or edge jointing lumber from stock of nonuniform widths.

More particularly, our invention relates to a mechanism which prepares the traveling stock of nonuniform widths by removing or jointing all excess portion of the stock over a predetermined width. Also, the mechanism is characterized by a transfer means which provides for transferring the stock from a lower fixed guiding table to an upper fixed guiding table; and lastly, the mechanism is characterized by having its parts so mounted that they may be readily retracted in order that jammed stock may be readily removed and thus reduce the time period incident to shut-downs.

In cutting the lumber stock from the tree, most mills will cut predetermined size of cants or timbers from the log to obtain the maximum dimensioned pieces or to obtain sizes of a given order, and the remainder of the log will be cut to permit most complete utilization of the lumber stock remaining. For example, in the fir lumber mills a large size piece of timber or cant, such as 12" x 24" of the length of the logs are often cut. At all times such cants are of full size and often are cut considerably oversize in order to insure that this cant will not be undersize. That is, in cutting timber or cants to fill an order it is the practice to cut oversize to insure that the cant or timber will not be of a size less than the dimensions required by that order. The tendency is to cut oversize and many times much oversize to take care of any errors which may arise by reason of the mechanical limitations of the equipment or human errors, which inaccuracies particularly arise by reason of the great speed at which it is attempted to work the equipment, as required by present day commercial operations. The remainder of the log is then cut into sizes to be used for other stock, as flooring stock.

In flooring stock, the lumber stock rough sawn to 1" x 3" is finished to approximately $\frac{25}{32}$" x 2⅝". The next size flooring is rough sawn to 1" x 4" and is finished to $\frac{25}{32}$" x 3⅝". The next commercial size flooring known is rough sawn to 1" x 6" and is finished to $\frac{25}{32}$" x 5⅝". After the stock is thus roughly cut to reserve sufficient for finishing, the stock is sorted out as 1" x 3" stock, 1" x 4" stock or 1" x 6" stock. Very often due to the fact that this stock is cut from the remainder of the log, it will not measure up to full width and a piece intended for 1" x 4" stock, for example, will not have sufficient excess to permit finishing to $\frac{25}{32}$" x 3⅝", so that the same must be put in the 1" x 3" stock. Also a piece in the 1" x 6" stock may be a small amount under width so that it must go in the 1" x 4" stock. This remainder of the log may be of such a size so that when stock is cut therefrom there will be provided a number of pieces roughly sawn which will measure less than enough reserve to finish a board to a width of 5⅝" therefrom and more than enough to finish a board to a width of 3⅝". These will be too small for the 1" x 6" stock and may be up to 1⅞" over the finished width of a 3⅝" finished piece of lumber.

Besides the boards that are undercut in width, many boards shrink in the drying operation so that they shrink undersize and must be put in the next smaller size. Also many boards must be placed in the next smaller stock because of the imperfection and inaccuracies, due to the rough sawing operations. For example, it is the practice to speed up the production of the rough saws as much as possible and in approaching the mechanical limitations of the rough sawing means, the saws will often tend to follow the grain of the stock, rather than following a straight line. Also in an attempt to increase the production, the lumber is fed past the rough sawing means at such high speed, which places such excessive strains on the sawing means, that the sawing means will tend to bend and not saw in a straight line. Such lumber is often encountered and is generally termed in the art as "snakey lumber." It is readily seen that if a board is attempted to be sawn, for example to 1" x 4" size, so that the same will dress out $\frac{25}{32}$" x 3⅝", and the edges are wavered with indentations therein amounting to as much as ½", such lumber can only dress out to $\frac{25}{32}$" x 2⅝" and will be undersized for rough sawn 1" x 4" stock.

The modern lumber manufacturing plant is an in-line production establishment. In such an establishment, for reasons above set forth, the lumber stock fed to a planer will come from the line of production with many overwidth boards. This has proved a serious problem in the lumber trade. Many solutions have been attempted, none of which have been completely successful.

Attempt has been made to sort out the overwidth pieces so that they were not mixed in with the pieces of substantially the proper width. This has proved unsatisfactory, because of labor costs in separating out these oversize boards, and it has also proved unsuccessful because the oversize boards must be cut down to the right size by sawing mechanisms as a separate operation. This, of course, again increased the cost. When these sorted out overwidth boards in lots or loads are run through a matcher or edge jointer without being reduced substantially to the proper width, this places an extremely heavy overload on the matchers or edge jointers and often "burned out" the motors. It has been impractical to increase the size of the motors to take care of the overloads because if the horse power of the motors was calculated for efficiency at normal running loads, the motors would be undersized for the overload of running selected overwidth boards. On the other hand, if the motor horse power were selected to take care of overwidth boards, the motors would be inefficient at normal loads, and there is also the physical limitations concerning space required by larger motors.

The most successful prior art commercial practice, therefore, has been to run the boards indiscriminately through the planer, whether they were overwidth or standard width and thereby prevent overloads on the motors for long periods. However, the matcher and edge jointer mechanism would not operate successfully at a high rate of speed on such a heterogeneous stock, including overwidth boards, and it has been necessary to slow down the rate of production, by approximately 50%, in many cases, to permit the matcher or edge jointer to run on mixed stock. This for the reason that the failure to slow down causes such an increased load on the machine that the machine may stop because of such overload conditions on the operating parts, or because of break-up of the lumber stock within the machine. This break-up of lumber stock results in costly shut-downs incident to removing the pieces of the jammed stock from the machine.

In the in-line production lumber mills it has been considered that the most desirable commercial practice was to run the stock mixed, i. e., with the overwidth pieces appearing when they would, and to permit the edge matchers or edge jointers to remove the excess width and to slow down the machine to a practical commercial speed, considering the particular stock being run. Besides overwidth pieces which appear in a given stock, very often a mill will have a sale for $\frac{25}{32}''$ x $2\frac{5}{8}''$ lumber, and they will have considerable 1" x 4" rough stock on hand. If the 1" were cut off to get the lumber down to proper rough size, this 1" piece cut off would be a useless piece of lumber stock and the labor required in handling the stock, in cutting off this 1", and disposing of the same would be an unnecessary cost. Therefore, it has been the practice to often run 1" x 4" rough stock or larger to produce $\frac{25}{32}''$ x $2\frac{5}{8}''$ finished lumber. This excess width was removed by the edge jointers or matchers and conditions similar to the overwidth pieces heretofore considered would obtain.

Thus, in commercial practice at in-line production lumber mills, non-uniform boards have been run direct to the matcher and edge jointer mechanism and the speed of production has been slowed down to permit the mechanism to operate on stock, including many overwidth boards therein. However, this slowing down of the rate of production has not taken care of the problem for many reasons. First, if a cutter head attempts to take off more than substantially $\frac{1}{2}''$ of stock, at practical production rates of feed, we have discovered, after extended experimentation, that the tearing action of the cutterhead in removing such a large part of stock causes a force tending to rip and tear the grain of the stock in excess of the cohesive strength of the stock to withstand such ripping or tearing. The result has been, therefore, to loosen or rip the grain below the cut edge approximately $\frac{1}{32}$ of an inch or $\frac{1}{16}$ of an inch, depending upon the character and species of the stock, speed of operation, and the amount being cut off. Second, due to the fact that the chip breakers will be violently urged outwardly by an overwidth piece of stock, the cutter heads tend to misalign the lumber stock and to side or edge snip the tail end of a preceding board of substantially the proper width, as well as the leading end of a trailing board of an extremely wide width. This violent urging of the chip breakers out of position tends to leave the lumber stock unsupported and free to vibrate and become snipped.

We have discovered that a pre-edge jointer or a pre-edge hogger means constituting the present invention may be placed in combination with a planing machine so that the stock will be prepared for final edge jointing by the matcher heads in the planing machine and substantially perfect edge jointing or matching will result.

In providing for pre-jointing or pre-hogging the board, we find that it is most desirable to adopt the following procedure. First: An inside cutter is provided to joint off the crooks and bumps only to provide a true edge to run against the long guide extending through the machine. It is important to have a true edge to follow the guide and this is particularly true as the lumber stock passes through the finishing, tonguing and grooving or matching heads or edge jointer. Second: A pre-jointing or pre-hogging cutter head is positioned to operate on the opposite edge of the board and to remove all excess width from the lumber stock.

We have also found that if the edges of the lumber are thus pre-hogged or pre-jointed, just prior to entering the planing machine, that the extreme vibration which is set up by such edge jointing in removing excessive lumber stock may be isolated from the planing machine so as not to interfere with the operation of the planing machine in providing a smooth surface and permit the highest quality of finishing work possible.

We have also found that any tearing or gouging or injuring which is caused by the pre-edge jointers or pre-edge hoggers will not extend ordinarily into the edges of the lumber more than about $\frac{1}{32}$ or an inch or about $\frac{1}{16}$ of an inch so that sufficient excess may be reserved so that these torn, gouged or injured portions will be removed by the final edge jointers or matchers.

We have also discovered that the removal, by a pre-edger or pre-hogger, of excessive width from one edge of the board, does not interfere with the final edge jointing of the board, despite the fact that ordinarily extremely heavy cuts on one edge tend to pull the board away from the fixed guide line. This is due to the fact that the feeding mechanism of the planer is positioned between the pre-hogging device and the final edge matchers, so that such feeding mechanism will force the lumber against the fixed guide edge and overcome any tendency of the hogging device to pull the lumber away from the guide edge because of excessive heavy cutting.

We have also found that, with a machine embodying our present invention, the lumber may be run at an extremely high rate of speed, such as 500 feet per minute, regardless of the uniformity of the width of the stock being fed. This is to be contrasted with prior art machines where the speed was commercially reduced substantially 50% when mixed stock, including many overwidth boards, was run through the machine.

We have also found that where a pre-edge jointer or a pre-edge hogger is employed just prior to the lumber entering the planing machine, that it will not interfere with the practical in-line production mill practices of today, so that lumber is not decreased in width until it is actually determined just what lumber is to be produced from said lumber stock.

The mechanism of our present invention is designed especially to work in connection with the planer constituting our invention set forth in application Serial No. 91,568, now Patent No. 2,102,186. But, obviously the invention is not to be restricted to any such specific machine, but extends to all such where like conditions exist in whole or in part. It is a feature of said planer that the upper feed bed is fixed during operation, while the lower feed bed is resiliently supported. In the feed table of common practice design, and which is in place in present mill installations, the lower feed bed is fixed and accordingly the mechanism of the present invention provides for "transferring" the stock from a fixed lower feed table to a lower resiliently supported feed table.

The primary object of our invention is to provide a mechanism which will overcome the many complex difficulties detailed above and to provide a mechanism characterized by a greatly increased efficiency, and a decided saving in operation in connection with one of our most important natural resources. Particularly is it our object to prevent the wasting of stock on which much labor has been spent by reason of the tearing or gouging of the grain of the wood and the snipping of the end portions. Also, it is a primary object of our invention to provide for the transfer of the stock from a lower fixed bed to an upper fixed bed and to provide for the mechanism parts to be readily retractable to permit jammed and broken stock to be quickly removed. Further, it is an object of this invention to provide connecting mechanism between this "pre-hogging" machine of the present invention and the planer machine with which it is associated or connected in operation, so that the operations of each are synchronized and dovetailed with the other.

In practice, where a board is edge snipped, the final matcher or jointer heads gouge out a portion on an edge of the board and provide an oppositely disposed raised portion adjacent thereto. The length of the edge snips often run four or five inches. Whenever stock is edge snipped, it is necessary to remove such edge snips to provide perfect processed lumber. To remove the portion of the stock which is edge snipped, requires reducing the length of the stock to the next shorter standard length to comply with standard grading rules and practices. In some boards and lengths, there is a two foot difference between standard lengths, so a snipped edge will require in some cases a loss of two feet of timber stock. For example, if a twelve foot board has an edge, at one end thereof, snipped it will be necessary to cut the board to a ten foot board to remove such snipped edge, as there is no standard eleven foot length board, involving on such a board a loss of sixteen and two-thirds percent of the stock. Such loss has heretofore involved an annular loss of tremendous proportions of one of our chief natural resources and the machine embodying our invention operates with only a negligible or no loss whatever caused by edge snipping, thus conserving time, labor and one of our valuable fast diminishing natural resources.

The above mentioned general objects of our invention, together with others inherent in the same, are attained by the mechanism illustrated in the following drawings, the same being preferred exemplary forms of embodiment of our invention, throughout which drawings like reference numerals indicate like parts.

Figure 1:
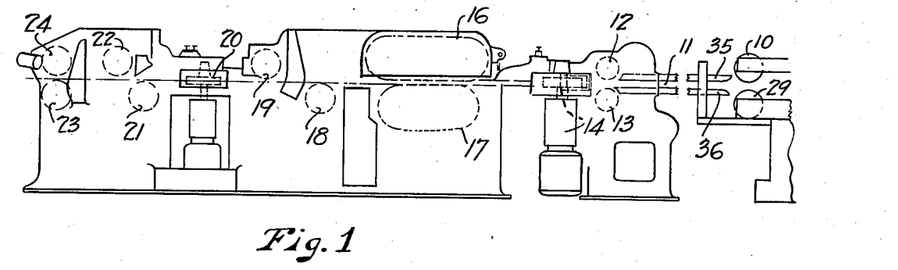
Figure 1 is a view in elevation, with parts somewhat diagrammatically illustrated, of an assembly view of the mechanism of this invention.
Figure 2:
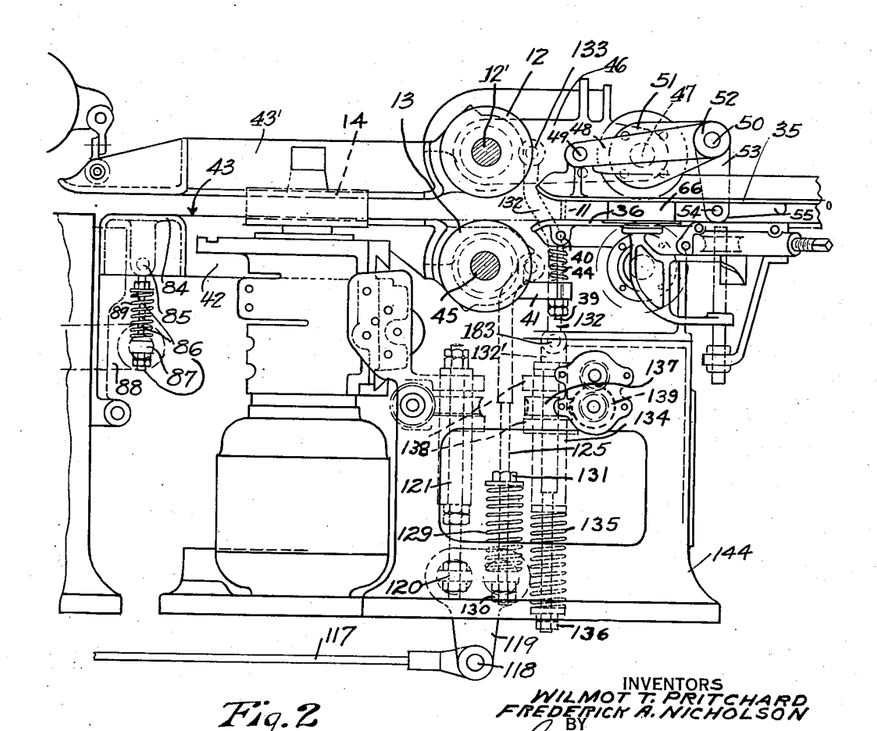
Fig. 2 is a view in side elevation, on a larger scale than Figure 1, showing in more detail the pre-edge jointing means.
Figure 3:
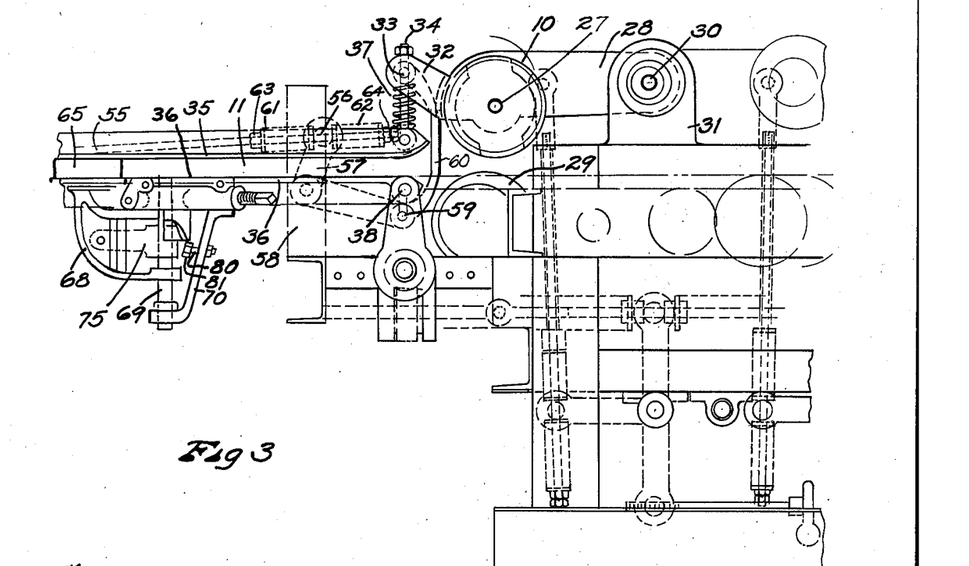
Fig. 3 is a view in elevation of the portion of the feeding table mechanism, which is shown in Figure 1 to the right of mechanism shown in Fig. 2.

Referring to Figure 1 of the drawings, we have shown schematically the various parts of the mechanism. The "infeed" end of the machine is to the right of Figure 1 of the drawings. The lumber is fed to feed rolls 10 and 29 by any feeding mechanism, such as the standard feed table mechanism, in part shown to the right of Fig. 6 of the drawings. The lumber is fed by feed rolls 10 and 29 at an accelerated rate through a tunnel or passageway 11 and thereby in end to end relation past floatingly or resiliently mounted feed rolls 12 and 13. The resiliently mounted feed rolls 12 and 13 urge the lumber past hog head or pre-edge jointers 14 and 15. The lumber stock passes between upper feed beds 16 and lower feed beds 17. An enlarged elevation is shown in Figs. 3 and 2 of the parts just located up to the feed beds 16 and 17. The feed beds and the connection to the left hand portion of Fig. 2 is shown in elevation in Fig. 4 of the drawings. The feed beds 16 and 17 urge the lumber past the lower face cutter head 18 and upper face cutter head 19, and also urge the lumber past final edge matchers 20, which edge joint or match both sides of the lumber.

If desirable, face pattern forming cutter heads or profilers 21 and 22 may be provided. The lumber is urged past such profilers and to the "outfeeding" end of the machine and out through "outfeeding" rolls 23 and 24.

The planing mechanism proper, commencing with feed beds 16 and 17, and ending with "outfeeding" rolls 23 and 24, is of the type generally disclosed in our copending application Serial No. 91,568 and is herein referred to in general as the planer mechanism.

Figure 6:
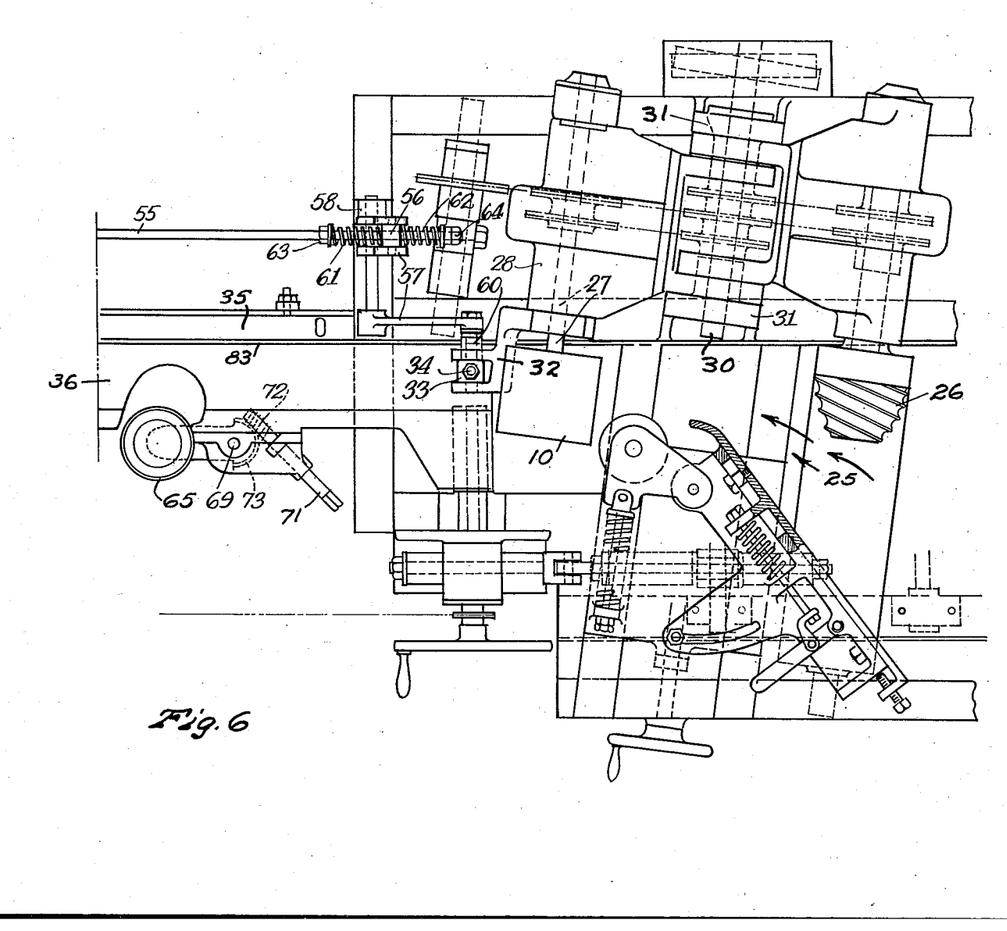
Fig. 6 is a plan view of the feeding table mechanism shown in Fig. 3.

Referring to Fig. 6 of the drawings, at the right hand end thereof a fragmentary portion of a feed table mechanism is illustrated. The lumber stock is urged in the direction generally indicated by arrows 25, where the feeding mechanism 26, generally referred to in the art as a "pineapple," urges the lumber forwardly between feed rolls 10 and 29 (driven by any suitable means not shown). Feed rolls 10 and 29 are caused to rotate at a substantially greater speed than floatingly mounted feed rolls 12 and 13. The feed roll 10 is shown in plan in Fig. 6 of the drawings and the feed rolls 10 and 29 are shown in elevation in Fig. 3 of the drawings. Lower feed roll 29 is mounted for rotary movement on a fixed shaft. Upper feed roll 10 is mounted on a resiliently mounted shaft in the following manner: The feed roll 10 is fixed to shaft 27, which is journaled or rotates in arm 28, which in turn is hingedly mounted on pin 30 supported by bracket casting 31 mounted upon the main frame of the machine. Arm 28 has an extended portion 32 in which is mounted pin 33. Link 34 is slidingly mounted in pin 33 and compression spring 37 is slidingly mounted on said link 34 and is positioned between the pin 33 and a plate 35. The link 34 is pivotally secured to an upper plate 35, which upper plate 35 and lower plate 36 form passageway 11. The lower plate 36 is pivotally secured to the main frame of the machine by pivot 38.

Thus, at this end of the machine the lower plate 36 is fixedly mounted, while the corresponding end portion of the upper plate 35 is resiliently mounted. The forward end of plate 36 is resiliently mounted as follows (see Fig. 2): Link 39 is pivotally connected to said plate 36 by pin 40 and the other end of link 39 is slidingly disposed through arm 41, which arm is an extension of member 42, which forms the floor of passageway 43, which passageway 43 is a continuation of passageway 11. On link 39 is located spring 44. Member 42 pivotally supports roll 13 and shaft 45. An upper guide member 43' which cooperates in forming passageway 43 is pivotally connected with an arm 46, which is pivotally mounted on the main frame of the machine by pin 47. The arm 46 provides a bearing for the shaft 12' of the upper feed roll 12.

Figures 7, 8, 9, 10:
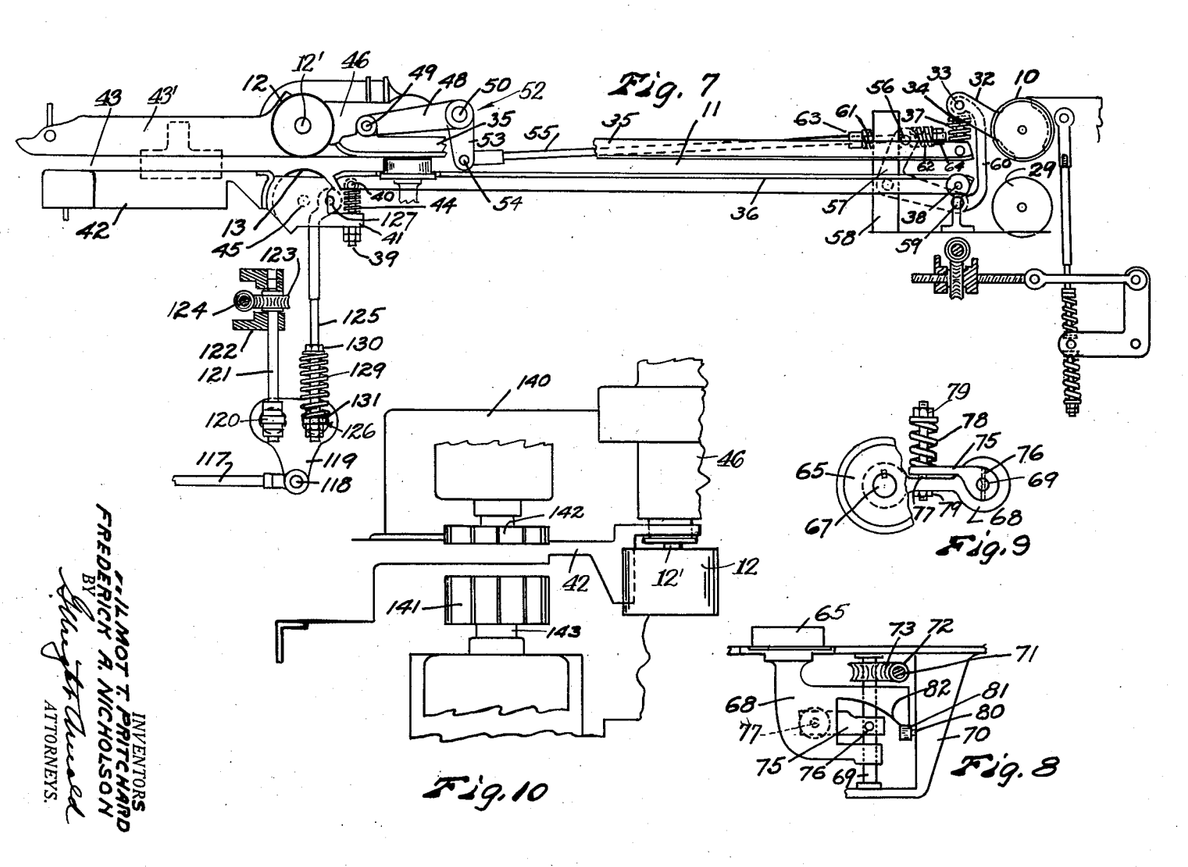
Fig. 7 is a somewhat diagrammatic view, with parts omitted and parts broken away, illustrating the transfer mechanism between the feeding table and the pre-edge jointer mechanism.
Fig. 8 is a detached elevation of a side hold-over roll and mounting means therefor.
Fig. 9 is a plan view of parts of the hold-over roll shown in Fig. 8.
Fig. 10 is a fragmentary plan view showing an alternative construction of a cutting means for the pre-edge jointer means.

The forward end of upper plate 35 is movably mounted as follows: Arm 48 of bell crank 52, see Figs. 7 and 2, is pivotally attached to plate 35 by pin 49. Bell crank 52 is pivotally mounted by pin 50 to the main frame 144 of the machine through bracket 51. Arm 53 of bell crank 52 is pivotally connected by means of pin 54 to rod 55, see also Fig. 3. Rod 55 is slidably mounted through an opening in pin 56, see Figs. 3, 6 and 7, which pin 56 is pivotally mounted in one arm of bell crank 57. Bell crank 57 is pivotally mounted in bracket 58, which is secured to the main frame of the machine. The other arm of bell crank 57 is pivotally secured by means of pin 59, and link 60 to extension 32 by means of pin 33. It will be noted from Fig. 6 that the two arms of bell crank 57 are transversely offset as respects each other. Rod 55 is provided with two springs 61 and 62 bearing upon pin 56 as respects two of their ends and held in position on said rod by nuts 63 and 64.

In passageway 11 are located hold-over rolls 65 and 66. The mounting of each of these is identical and so the mounting of roll 65 alone will be described. (See Figs. 3, 8, and 9.) Roll 65 is rotatably mounted by means of pin 67 to arm 68. Arm 68 is pivotally mounted on shaft 69, which is rotatably supported from plate 36 by means of bracket 70. In bracket 70 is rotatably mounted shaft 71, upon which is mounted worm 72, which meshes with worm wheel 73, which in turn is rigidly attached to shaft 69 by means of a key. On shaft 69 is also rigidly mounted an arm 75, fixed to shaft 69 by means of pin 76. Slidably disposed through arm 68 and 75 is bolt 77, upon which at its inner end is slidingly mounted compression spring 78, which may be adjusted by means of nuts 79. Fixedly inserted in bracket 70 is pin 80, which supports roller 81 disposed to bear against cam 82 carried by arm 68. Hold-over rolls 65 and 66 are to hold over or urge sidewise traveling lumber stock against guide member 83, thereby tending to straighten crooked lumber during its passage through the machine.

In the event of an accident and lumber should become jammed in the machine, we have provided efficient means for readily removing the lumber stock from passageway 11 by having the hold-over rolls 65 and 66 so mounted so that they may be readily retracted as follows: Rotating shaft 71 causes shaft 69 to rotate through worm 72 and worm wheel 73, which may swing arm 75 and resiliently actuate arm 68 by means of spring 78 mounted on bolt 77 in a direction toward guide 83. Then opposite rotation of shaft 71 would actuate arm 75 and thereby arm 68 in a direction away from the lumber and guide 83, so as to clear plate 36. Further rotation of shaft 69 eventually permits arm 68 to move downward on account of cam 82 progressively rotating over roll 81, due to characteristics of cam 82. Thus, hold-over roll 65 takes up a position below the face of lower plate 36, permitting easy removal of lumber from passageway 11.

The forward end of the passageway 43 is formed above portion 84 of member 42, which has one end portion pivotally connected to the link 125 which supports the end portion of said member 42 and the feed roll 13. The other end portion 84 is resiliently supported as follows: portion 84 is pivotally or hingedly connected by pivot means 85 with a link 86. Link 86 is slidingly received within an opening in pin 87, which pin 87 is pivotally mounted on an arm 88. A compression spring 89 is slidingly disposed on link 86 and the spring tension thereof may be adjusted by a suitable means, such as the nut means shown.

Figure 4:
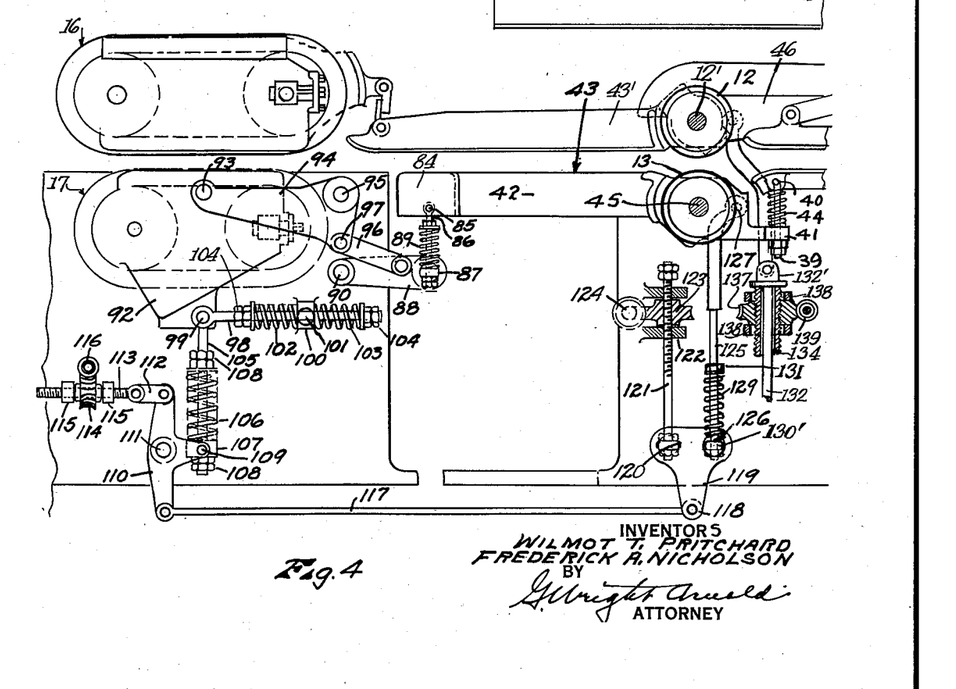
Fig. 4 is a view in elevation of the planer feed mechanism, which is shown in Figure 1 to the left of the mechanism shown in Fig. 2.

Referring more particularly to Fig. 4, the arm 88 has its other end portion pivotally connected with the main frame by pivot means 90. The lower feed bed 17 has a frame means 92. This frame means 92 has its upper portion pivotally connected by a pivot means 93 with the swinging portion of a bell crank 94 which is pivotally connected with the main frame of the machine by pivot means 95. The bell crank 94 is pivotally connected with one end of a link 96 by pivot means 97 and the other end of the link 96 is pivotally connected with the arm 88. Thus, as the bell crank 94 is swung counterclockwise, as seen in Fig. 4, about pivot means 95 the link 96 will be urged downwardly and the arm 88 will be also swung downwardly about its pivot means 90. Therefore, as lower feed bed 17 is lowered, the portion 84 will be likewise lowered. However, portion 84 being resiliently mounted by compression spring 89 may be urged downwardly by a piece of lumber stock thereabove independently of the lower feed bed 17. Also as the lower feed bed 17 is pivotally supported by pivot means 93 on the bell crank 94, pivotal movement of lower feed bed 17 will be independent of any movement of the bell crank 94. This connection provides means so that when the lower feed bed 17 is lowered to remove broken pieces of lumber, the portion 84 may be simultaneously lowered with lower feed bed 17.

The resilient mounting for the lower feed bed 17 may be in the nature of a substantially horizontally positioned link 98 pivotally connected with the lower portion of the frame means 92 as by pivot means 99. A collar 100 is pivotally secured to the main frame of the machine by pivot means 101. The link means 98 is slidingly received in the collar 100. Compression springs 102 and 103 are slidingly positioned on the link 98 and held in place by any suitable means such as the nut means 104.

A substantially vertical disposed link 105 is pivotally connected with the frame 92 of the lower feed bed 17. This link 105 may be connected with the pivot means 99. Spring means 106 is slidingly positioned on link 105. The collar 107 is also slidingly positioned on the link 105. Spring 106 and collar 107 are held in place with any suitable means such as nut means 108.

The collar 107 is pivotally connected by pivot means 109 to a T shaped arm 110. The T shaped arm 110 is pivotally connected with the main frame of the machine by pivot means 111 to provide angular movement of the T shaped arm 110. The link 112 has one end portion pivotally connected with the T shaped arm 110 and the other end portion pivotally connected with a screw 113. The screw 113 is threadedly connected with a worm wheel 114. The worm wheel 114 is held in place between projections 115 secured to the main frame of the machine. The worm wheel 114 meshes with a worm 116. The T shaped arm 110 is also pivotally connected to a rod 117.

Thus, by the worm wheel and link described, T shaped arm 110 may be angularly moved in one direction, whereupon frame means 92 of the lower feed bed 17 will be lowered and in turn the resiliently supported portion 84 will also be lowered. Angular movement in the other direction of the T shaped arm 110 will raise the feed bed 17 with the resiliently mounted portion 84. As the lower feed bed 17 is lowered the rod 117 will be pulled in a direction towards the left of Fig. 4 of the drawings, while raising of the lower feed bed 17 will move the rod 117 towards the right as respects Fig. 4 of the drawings.

The rod 117 is pivotally connected by a pivot means 118 with a cloverleaf shaped member 119. The cloverleaf shaped member 119 is fulcrumed on a movable pivot means 120. The movable pivot means 120 is pivotally connected with a link 121, which link is slidable through projections 122 of the main frame of the machine. A worm wheel 123 is threadedly secured to the link 121 and meshes with a worm 124. Thus, as the worm 124 is angularly moved, the link 121, and in turn the movable pivot 120, may be raised or lowered, carrying the cloverleaf member 119 therewith. In the event that the rod 117 remains stationary, raising or lowering of the movable pivot means 120 will raise or lower another link 125 substantially parallel to link 121.

On the link 125 is slidingly positioned a spring means 129. The spring means 129 is positioned between nut means 131 fixed to link 125 and a collar 130′, which collar is slidingly positioned on the link means 125. A nut means 130 is threadedly connected to link 125 and serves as an adjustment for link 125. The collar means 130 is pivotally connected by pivot means 126 with the cloverleaf 119. Thus the link 125 is pivotally supported by the cloverleaf 119 and a resilient member 129 is disposed between the collar means 130′ and the fixed nut means 131 on link 125. The link 125 is connected by pivot means 127 with the housing pivotally supporting the lower feed roll 13.

In the event that the lower feed bed 17 is lowered, which will in turn lower the portion 84, as previously discussed, also a feed roll 13 will be lowered as the rod 117 moves towards the left as respects Fig. 4 of the drawings. The movement of rod 117 to the left as respects Fig. 4 of the drawings will angularly move the cloverleaf shaped member 119 in a clockwise position about pivot means 120. This will pull link 125 downwardly and at the same time move the feed roll 13 downwardly. On the other hand, in the event the rod 117 is stationary by angularly moving the worm 124 the feed roll 13 may be raised or lowered independently of the lower feed bed 17 or resiliently mounted portion 84. This because such angular movement of the worm 124 will raise or lower the cloverleaf shaped member 119, and in turn the link 125 and feed roll 13.

Referring to Fig. 2, a link 132 is pivotally connected at one end by pivot means 133 with the arm 46 supporting the upper feed roll 12. The lower end of the link 132 is slidable within a sleeve 134. An abutment 132′ on said link 132 engages the upper end portion of sleeve 134. A pivot 183 is preferably provided in link 132 at abutment 132′. A spring 135 is positioned between the sleeve 134 and nut means 136, which nut means is threadedly connected with the link 132. A worm wheel 137 is threadedly connected with the sleeve 134 and worm wheel 137 is held in place between projecting portions 138 of the main frame of the machine. A worm 139 meshes with worm wheel 137. By angular movement of the worm 139 the sleeve 134 may be raised or lowered, raising therewith the upper feed roll 12. Regardless of the position of the upper feed roll 12, substantially the same spring tension will be provided by spring 135 because of the adjustment just described.

In the type of planing mechanism herein illustrated, the upper feed line is fixed, while the lower feed line is resiliently mounted. In order, therefore, to remove broken lumber in the event of a shut-down it is advisable to loosen the lumber by moving all of the resiliently mounted feed rolls or pressure means. We have provided means so that all of the resiliently mounted feed rolls or pressure means in the planing device (see our co-pending application Serial No. 91,568), may be rapidly lowered by power mechanism. At the same time that the lower feed bed 17 is thus lowered, either by power mechanism or by a movement of worm 116, the lower feeding line of the bed through our pre-hogging mechanism will be simultaneously lowered, thus saving considerable time. As the upper feed line is the fixed line in the mechanism herein illustrated, the movement of the parts thereof will not be required except when the machine is readjusted to take a different sized lumber.

Figures 5, 11:
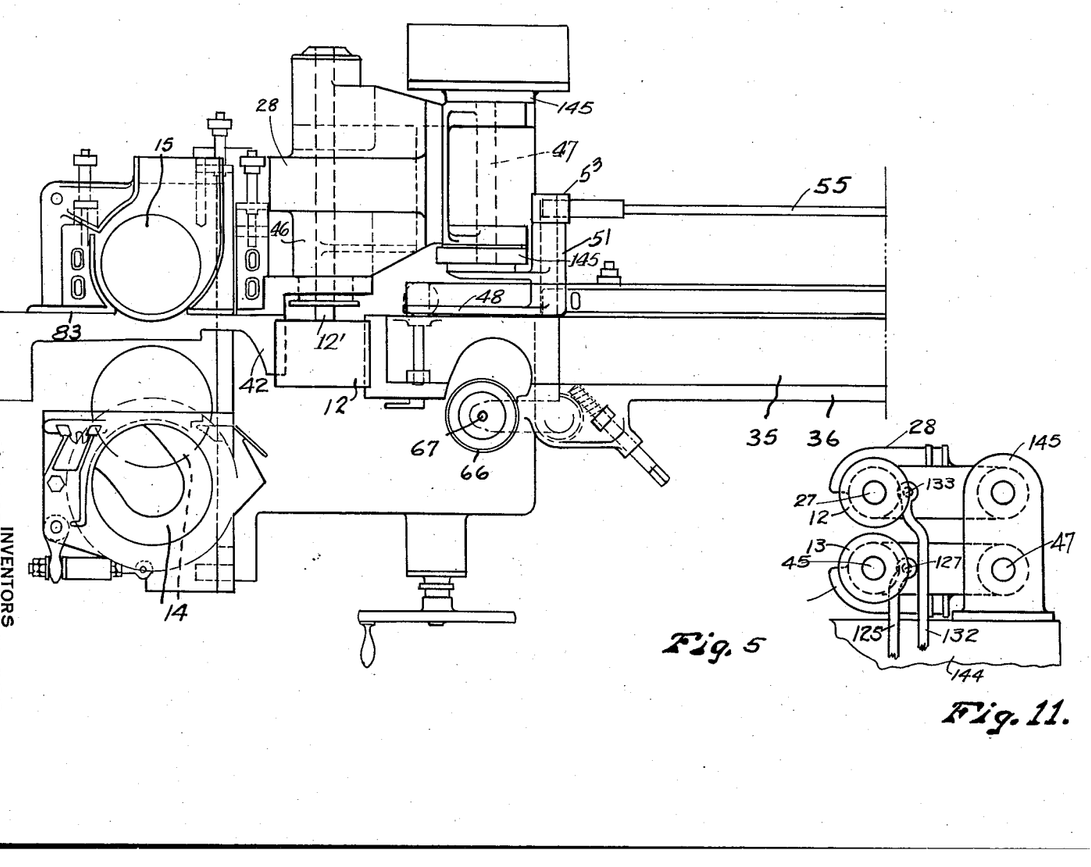
Fig. 5 is a plan view of the pre-edge jointing means shown in Fig. 2.
Fig. 11 is a fragmentary view in elevation of the supporting means of feed rolls 12 and 13.

By the means illustrated, upper feed roll 12 and lower feed roll 13 are both resiliently mounted rolls and will therefore tend to readily follow and conform with the surface of the rough lumber stock presented thereto. These feed rolls serve to urge the lumber stock past pre-edge matchers 14 and 15. Referring to Fig. 5 of the drawings, the pre-edge matcher 15 extends slightly through the guide 83. By any usual means the side-cutter head may be readily adjusted. The adjustment should be, however, to merely skin or true-up the guide edge of the stock. All excess is to be removed by the pre-edge matcher or pre-hogger 14. The pre-hogger 14 is adjustable toward and away from the guide 83 to accommodate for any particular width of lumber desired. For example, if lumber stock having a finished width of two and five-eighths inches is desired, the lateral position of the pre-hogger 14 may be set to provide the minimum excess changes to clear up the stock by the final edge matcher 20. We have discovered that a pre-hogging head, such as a hogger head 14, will rip grain because of excessive cutting. The ripped or torn grain may extend approximately one-eighth to one-sixteenth of an inch below the surface so that enough should be reserved to completely remove that ripped or torn grain.

In Fig. 5 of the drawings we have shown pre-hogging heads 14 and 15 rotatably driven on vertically disposed shafts. In Fig. 10 of the drawings we have shown as an alternative construction, two pre-hogging heads 140 and 141 disposed on horizontal shafts 142 and 143. The pre-hogging heads 140 and 141 may have cutter heads which are often known as dado cutters, or they may comprise a plurality of saws laid side by side until the desired width of cutting device is thereby made up. In view of the fact that the only change in the alternative construction of Fig. 10 is in the pre-hogging heads, other portions of the figure have been largely broken away.

The mode of operation of the mechanism thus illustrated may be summarized as follows: Traveling lumber stock is introduced in the direction of the arrows in Fig. 6 of the drawings and urged forwardly by the "pineapple" 26 and engages feed rolls 10 and 29. These feed rolls 10 and 29 are driven at an accelerated speed and the lumber stock arrives in end to end relation when contacting driven feed rolls 12 and 13. The lumber stock is supported on a fixed roll 29 in the feeding table and in the tunnel 11 the lumber is being transferred from a fixed lower bed to a resiliently mounted lower bed. The driven feed rolls 12 and 13 are both resiliently mounted, and at this point the feeding is substantially resilient on both the upper surface and the lower surface contacting the lumber stock. The driven feed rolls 12 and 13 are driven at substantially the rate of speed of the planers. These feed rolls 12 and 13 urge the lumber stock forwardly past pre-edge jointers or hoggers 14 and 15. The traveling lumber is urged against the guide by the hold-over rolls 66. Pre-edge jointer 15 serves to skin off and true up the guide edge of the lumber stock, while the pre-edge jointer or hogger 14 serves to remove all excess stock. The lumber then enters feeding means of the planer proper. At this time the lumber is transferred from a lower fixed bed to the lower resiliently supported fixed bed 17 of the planer. The feeding beds 16 and 17 of the planer serve to urge the stock past the cutter heads 18, 19, 20, 21 and 22. Also the feed beds 16 and 17 serve to isolate the shock and vibration caused by pre-hogging the stock from the final finishing cutter heads in the planer mechanism.

The rear end of the upper plate of the transfer means is quite freely resiliently mounted, while the rear end of the lower plate of the transfer means is fixedly pivotally mounted upon the frame. The front end of the upper plate of the transfer means is more stiffly resiliently mounted than the rear end of the upper plate. This resiliency is due to the mounting of the spring means. On the other hand the front end of the lower bed plate is relatively freely resiliently mounted so that the excess in thickness or unevenness of lumber now begins to project downwardly and thus compresses the lower resiliently mounted means, while the upper line of the lumber begins to approach more nearly the upper fixed bed-line of planer. Also it will be noted (see Fig. 5) that the upper feed roll 12 is mounted on arm 46, which arm in turn is pivotally mounted on a stanchion 145 or projection of the frame 144. Arm 46 is pivotally connected to a link 132, which has a sleeve 134. The link 132 passes through said sleeve and is provided with spring 135, which bears against nut 136, Figs. 2 and 4. The sleeve 134 is operatively connected to a worm gear for fixedly adjusting the position of the upper feed roll. The link spring 135 is a relatively stiff spring and performs more the function of an emergency safety means rather than permitting the upper feed roll to move reciprocably in response to the lumber passing thereunder during operation. That is, the upper roll 12 is almost a fixedly mounted roll. Thus again, it is emphasized that in our invention the upper means contacting the lumber, whether the same be a plate, or whether the same be a feed roll, is gradually progressively made less and less resilient. In this wise the said upper stock contacting means progressively presses the stock down until the upper side is in alignment with the fixed bed of the planer. The converse is true of the lower stock contacting means.

Obviously, changes may be made in the forms, dimensions and arrangement of the parts of our invention, without departing from the principle thereof, the above setting forth only preferred forms of embodiment.

We claim:

1. In a device of the class described, a lumber feeding table provided with a fixed lower lumber feeding means and a resiliently supported upper lumber feeding means positioned in operative vertical spaced relation to the lower lumber feeding means; a feeding device positioned in longitudinal spaced relation to said feeding table and provided with a fixed upper lumber feeding means and a resilient lower lumber feeding means positioned in operative vertical spaced relation to the upper lumber feeding means; and transfer means adapted to transfer travelling lumber from said feeding table to said feeding device, said transfer means comprising a longitudinally disposed upper plate resiliently supported at each end portion and a lower longitudinally disposed plate positioned in operative vertical spaced relation to the upper plate, said lower plate being pivotally supported at the feeding table end portion and resiliently supported at the said feeding device end portion.

2. In a device of the class described, a lumber feeding table provided with a fixed lower lumber feeding means and a resiliently supported upper lumber feeding means positioned in operative vertically spaced relation to the lower lumber feeding means; a feeding device positioned in longitudinal spaced relation to said feeding table and provided with a fixed upper lumber feeding means and a resilient lower lumber feeding means positioned in operative vertical spaced relation to the upper lumber feeding means; transfer means adapted to transfer travelling lumber from said feeding table to said feeding device, said transfer means comprising a longitudinally disposed upper plate resiliently supported at each end portion and a lower longitudinally disposed plate positioned in operative vertical spaced relation to the upper plate, said lower plate being pivotally supported at the feeding table end portion and resiliently supported at the said feeding device end portion; and a pre-edge jointer operatively disposed between said feeding table and said feeding device and positioned to operate on the edges of lumber stock travelling thereby.

3. In a device of the class described, a lumber feeding table provided with a fixed lower lumber feeding means and a resiliently supported upper lumber feeding means positioned in operative vertically spaced relation to the lower lumber feeding means; a feeding device positioned in longitudinal spaced relation to said feeding table and provided with a fixed upper lumber feeding means and a resilient lower lumber feeding means positioned in operative vertical spaced relation to the upper lumber feeding means; transfer means adapted to transfer traveling lumber from said feeding table to said feeding device, said transfer means comprising a longitudinally disposed upper plate resiliently supported at the rear end portion and more stiffly resiliently adjustably supported at the forward end; a lower longitudinally disposed plate positioned in operative vertical spaced relation to the upper plate, said lower plate as respects one end being pivotally supported at the feeding table end portion and resiliently supported at the said feeding device end portion; a pre-edge jointer operatively disposed between said feeding table and said feeding device and positioned to operate on the edges of lumber stock traveling thereby; and two spaced apart vertically disposed resiliently mounted feed rolls urging said traveling lumber past said pre-edge jointer.

4. In a device of the class described, transfer means comprising a longitudinally disposed upper plate resiliently supported at the rear end, and more stiffly resiliently adjustably supported at the forward end and a lower longitudinally disposed plate positioned in operative vertical spaced relation to the upper plate, said lower plate as respects one end being pivotally supported at one end portion and resiliently supported at the other end portion and two spaced apart vertically disposed resiliently mounted feed rolls urging traveling lumber through said transfer means.

5. In a device of the class described a longitudinally disposed upper plate resiliently supported at the rear end, and more stiffly resiliently adjustably supported at the forward end; and a lower longitudinally disposed plate positioned in operative vertical spaced relation to the upper plate, said lower plate as respects one end being fixedly pivotally supported and resiliently supported at the other end portion, whereby a stock transfer means is provided.

6. In a device of the class described, a lumber feeding table provided with upper and lower lumber feeding means; a feeding device positioned in longitudinal spaced relation to said feeding table and provided with an upper lumber feeding means and a retractable lower feeding means positioned in operative vertical spaced relation thereto; transfer means adapted to transfer traveling lumber from said feeding table to said feeding device, said transfer means comprising a longitudinally disposed upper plate and a lower retractable longitudinally disposed plate positioned in operative vertical spaced relation to the upper plate; and means interconnecting the lower retractable lumber feeding means of the feeding device and the lower retractable longitudinally disposed plate of the transfer means, whereby in the event of lumber break-ups in the device, the lower retractable feeding means and the lower retractable plate may be moved together to permit rapid and efficient removal of broken pieces of lumber.

7. In a device of the class described, a lumber feeding table provided with vertically disposed lumber feeding means; a feeding device positioned in longitudinal spaced relation to said feeding table and provided with vertically disposed lumber feeding means, one of which is mounted for retractile movement; transfer means adapted to transfer traveling lumber from said feeding table to said feeding device, said transfer means comprising longitudinally disposed vertically spaced apart plates, one of which is mounted for retractile movement; and means interconnecting the lumber feeding means of the feeding device mounted for retractile movement and the longitudinally disposed plate of the transfer means mounted for retractile movement whereby in the event of lumber break-ups in the device, the retractable feeding means and the retractable plate may be moved together to permit rapid and efficient removal of broken pieces of lumber.

8. In a device of the class described, a lumber feeding table provided with vertically disposed lumber feeding means; a feeding device positioned in longitudinal spaced relation to said feeding table and provided with vertically disposed lumber feeding means, one of which is mounted for retractile movement; transfer means adapted to transfer traveling lumber from said feeding table to said feeding device, said transfer means comprising longitudinally disposed vertically spaced apart plates, one of which is mounted for retractile movement; two spaced apart vertically disposed feed rolls urging lumber through said transfer means, one of which feed rolls is mounted for retractile movement; and means interconnecting the lumber feeding means of the feeding device mounted for retractile movement, the longitudinally disposed plate of the transfer means mounted for retractile movement, and the feed roll mounted for retractile movement, whereby in the event of lumber break-ups in the device, the retractable feeding means, the retractable plate and the retractable roll may be moved together to permit rapid and efficient removal of broken pieces of lumber.

9. In a device of the class described, a lumber feeding table provided with vertically disposed lumber feeding means; a feeding device positioned in longitudinally spaced relation to said feeding table and provided with vertically disposed lumber feeding means, one of which is mounted for retractile movement; transfer means adapted to transfer traveling lumber from said feeding table to said feeding device; two vertically spaced apart feed rolls urging traveling lumber through said transfer means, one of which feed rolls is mounted for retractile movement; and means interconnecting the lumber feeding means of the feeding device mounted for retractile movement and the said roll mounted for retractile movement, whereby in the event of lumber break-ups in the device the retractable feeding means and the retractable feed roll may be moved together to permit rapid and efficient removal of broken pieces of lumber.

10. A device of the class described embodying a pre-edge jointer mechanism; a feeding device comprising two spaced apart vertically disposed resiliently mounted feed rolls operatively disposed with respect to said pre-edge jointer; a lumber feeding table provided with a fixed lower feeding means and a resiliently supported upper feeding means positioned in operative vertically spaced relation to the lower lumber feeding means; transfer means adapted to transfer traveling lumber from said feeding table to said feeding device, said transfer means comprising a longitudinally disposed upper plate resiliently supported at the rear end and more stiffly resiliently adjustably supported at the forward end; and a lower longitudinally disposed plate positioned in operative vertical spaced relation to the upper plate, said lower plate being pivotally supported in the feeding table end portion and resiliently supported at the said feeding device end portion; a lumber stock edge guide means; and hold-over roll urging traveling lumber against said lumber stock guide means.

11. In a device of the class described a frame; a feed roll; a pivotally mounted housing carrying said feed roll; and longitudinally disposed upper and lower plates forming a passageway for lumber, said upper plate having a mounting means comprising, a link, a pin pivotally mounting one end of said link to said housing, a longitudinally disposed rod, a bell crank pivotally mounted on said frame having one arm pivotally connected to said link and the other arm connected to said rod by a spring mounted pivotal means, an eye bolt slidingly and pivotally connected to said pin as respects one end and the other end pivotally connected to the end portion of said upper plate, a spring carried by said eye bolt and bearing on said plate and said pin, a second bell crank pivotally mounted on the frame having one arm pivotally connected to the forward end of the upper plate and the other arm pivotally connected to the forward end of said rod.

12. In a device of the class described a frame; a feed roll; a pivotally mounted housing carrying said feed roll; longitudinally disposed upper and lower plates forming a passageway for lumber, said upper plate having a mounting means comprising, a link, a pin pivotally mounting one end of said link to said housing, a longitudinally disposed rod, a bell crank pivotally mounted on said frame having one arm pivotally connected to said link and the other arm connected to said rod by a spring mounted pivotal means, an eye bolt slidingly and pivotally connected to said pin as respects one end and the other end pivotally connected to the end portion of said upper plate, a spring carried by said eye bolt and bearing on said plate and said pin, a second bell crank pivotally mounted on the frame having one arm pivotally connected to the upper plate and the other arm pivotally connected to the forward end of said rod; an arm pivotally connected to the frame; a resilient means supporting said arm; an eye member carried by said arm; a bolt pivotally connected to the forward end of said lower plate and passing through said eye member; and a spring operatively disposed on said link between said eye member and said pivotal connection with the plate.

13. In a device of the class described, a frame; a longitudinally disposed upper plate resiliently supported at the rear end and more stiffly resiliently supported at the forward end; a lower longitudinally disposed plate positioned in operative vertically spaced relation to the upper plate, said lower plate being at the rear end fixedly pivotally connected to said frame; and a stanchion mounted on said frame, an arm pivotally connected to said stanchion, an eye member carried by said arm, a bolt pivotally connected to the forward end of said lower plate and passing through said eye member, a spring operatively disposed on said bolt between said eye member and said pivotal connection with the plate.

14. In a device of the class described a frame; a longitudinally disposed upper plate resiliently supported at the rear end and more stiffly resiliently supported at the forward end; a lower longitudinally disposed plate positioned in operative vertically spaced relation to the upper plate, said lower plate being at the rear end fixedly pivotally connected to said frame; a stanchion mounted on said frame, an arm pivotally connected to said stanchion, an eye member carried by said arm, a bolt pivotally connected to the forward end of said lower plate and passing through said eye member, a spring operatively disposed on said bolt between said eye member and said pivotal connection with the plate; a shaft mounted in one end of said arm; a lower feed roll mounted on said shaft; a lower feed bed member hingedly connected to said shaft as respects one end portion and the other end portion being connected to resilient supporting means; a pre-edge jointer mounted intermediate the length of said feed bed member; a second arm pivotally connected to said stanchion; a second shaft mounted in one end of said second arm; an adjusting supporting link pivotally connected to said second arm; a relatively stiff spring operatively mounted on said supporting link; an upper feed roll mounted on said second shaft operatively disposed with respect to said lower feed roll; an upper bed member hingedly mounted on said second shaft as respects one end; a planer feeding mechanism comprising an upper fixedly mounted endless feed bed and a resiliently mounted lower endless feed bed; a link means connecting the said upper endless feed bed with the forward end of said upper feed bed member; and link means connecting the lower endless feed bed with the forward end of said lower feed bed member.

FREDERICK A. NICHOLSON.
WILMOT T. PRITCHARD.